US008789210B2

(12) United States Patent
Arnold et al.

(10) Patent No.: US 8,789,210 B2
(45) Date of Patent: *Jul. 22, 2014

(54) KEY USAGE POLICIES FOR CRYPTOGRAPHIC KEYS

(75) Inventors: Todd W. Arnold, Charlotte, NC (US); Elizabeth A. Dames, Concord, NC (US); Carsten D. Frehr, Farum (DE); Michael J. Kelly, Wappingers Falls, NY (US); Kenneth B. Kerr, New Paltz, NY (US); Richard V. Kisley, Charlotte, NC (US); Eric D. Rossman, Wappingers Falls, NY (US); Eric B. Smith, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/100,693

(22) Filed: May 4, 2011

(65) Prior Publication Data

US 2012/0281839 A1 Nov. 8, 2012

(51) Int. Cl.
*G06F 11/00* (2006.01)

(52) U.S. Cl.
USPC .................................. 726/31; 726/32; 726/33

(58) Field of Classification Search
CPC .. H04L 9/3213; H04L 63/0807; H04L 9/0819
USPC .............................................. 726/31, 32, 33
See application file for complete search history.

(56) References Cited

U.S. PATENT DOCUMENTS

| | | | |
|---|---|---|---|
| 4,941,176 A | 7/1990 | Matyas et al. | |
| 5,200,999 A | 4/1993 | Matyas | |
| 5,661,803 A | 8/1997 | Cordery et al. | |
| 5,928,330 A * | 7/1999 | Goetz et al. | 709/231 |
| 6,104,810 A | 8/2000 | DeBellis et al. | |
| 7,660,421 B2 | 2/2010 | Hopkins et al. | |
| 8,254,571 B1 | 8/2012 | Boyen | |
| 2003/0163433 A1 | 8/2003 | Lam et al. | |
| 2003/0210791 A1 | 11/2003 | Binder | |
| 2004/0001595 A1* | 1/2004 | Hopkins et al. | 380/277 |
| 2004/0039925 A1 | 2/2004 | McMillan | |
| 2004/0052377 A1 | 3/2004 | Mattox et al. | |
| 2006/0002549 A1 | 1/2006 | Avasarala et al. | |
| 2006/0068814 A1* | 3/2006 | Cheng et al. | 455/466 |
| 2006/0177066 A1 | 8/2006 | Han et al. | |
| 2006/0242407 A1 | 10/2006 | Kimmel et al. | |
| 2006/0265338 A1 | 11/2006 | Rutkowski et al. | |
| 2007/0014399 A1 | 1/2007 | Scheidt et al. | |

(Continued)

OTHER PUBLICATIONS

U.S. Appl. No. 13/047,344, filed Mar. 14, 2011.

(Continued)

*Primary Examiner* — Luu Pham
*Assistant Examiner* — Christopher Brown
(74) *Attorney, Agent, or Firm* — Cantor Colburn LLP; Steven Chiu

(57) ABSTRACT

A computer program product for secure key management is provided. The computer program product includes a tangible storage medium readable by a processing circuit and storing instructions for execution by the processing circuit for creating a token and populating the token with key material, and binding key control information to the key material. The key control information includes information relating to usage of the key material populating one or more key usage fields that define attributes that limit actions that may be performed with the key material.

7 Claims, 8 Drawing Sheets

(56) References Cited

U.S. PATENT DOCUMENTS

| | | |
|---|---|---|
| 2007/0127722 A1 | 6/2007 | Lam et al. |
| 2007/0160201 A1 | 7/2007 | Blom et al. |
| 2007/0189541 A1 | 8/2007 | Lam et al. |
| 2007/0204158 A1 | 8/2007 | Hatashita et al. |
| 2007/0217613 A1 | 9/2007 | Lam et al. |
| 2008/0046732 A1 | 2/2008 | Fu et al. |
| 2008/0065888 A1 | 3/2008 | Zheng et al. |
| 2008/0070577 A1 | 3/2008 | Narayanan et al. |
| 2008/0209221 A1 | 8/2008 | Vennelakanti et al. |
| 2008/0298589 A1 | 12/2008 | Katar et al. |
| 2009/0092252 A1* | 4/2009 | Noll et al. .................. 380/277 |
| 2009/0106551 A1 | 4/2009 | Boren et al. |
| 2009/0232312 A1* | 9/2009 | Inoue et al. .................. 380/278 |
| 2010/0158247 A1* | 6/2010 | Hopkins et al. .................. 380/44 |
| 2011/0156873 A1 | 6/2011 | Choi et al. |

OTHER PUBLICATIONS

U.S. Appl. No. 13/095,226, filed Apr. 27, 2011.
U.S. Appl. No. 13/100,354, filed May 4, 2011.
U.S. Appl. No. 13/100,357, filed May 4, 2011.
U.S. Appl. No. 13/100,639, filed May 4, 2011.
Office Action dated Dec. 7, 2012 for corresponding U.S. Appl. No. 13/047,344.
Office Action dated Dec. 4, 2012 for corresponding U.S. Appl. No. 13/100,354.
Office Action dated Dec. 5, 2012 for corresponding U.S. Appl. No. 13/100,357.
Office Action dated Oct. 1, 2012 for corresponding U.S. Appl. No. 13/100,639.
U.S. Appl. No. 13/047,344, filed Mar. 14, 2011; Final Office Action dated Mar. 29, 2013; 14 pages.
U.S. Appl. No. 13/095,226, filed Apr. 27, 2011; Non-Final Office Action dated Feb. 11, 2013; 36 pages.
U.S. Appl. No. 13/095,226, filed Apr. 27, 2011; Final Office Action dated Jun. 7, 2013; 34 pages.
U.S. Appl. No. 13/100,354, Final Office Action dated Mar. 27, 2013; 37 pages.
U.S. Appl. No. 13/100,639, filed May 4, 2011; Final Office Action dated Apr. 4, 2013; 14 pages.
U.S. Appl. No. 13/649,768, filed Oct. 11, 2012; Non-Final Office Action dated Feb. 12, 2013; 35 pages.
U.S. Appl. No. 13/649,768, filed Oct. 11, 2012; Final Office Action dated Jun. 7, 2013; 30 pages.

* cited by examiner

| 402 | 404 | 406 | 408 | 410 | 412 |
|---|---|---|---|---|---|
| Key Material State | Wrapping KVP Type | Wrapping KVP Value | Wrapping Method | Hash Method | Reserved |

| key-management field count | key-management field 1 (KMF1) | | key-management field 2 (KMF2) | |
|---|---|---|---|---|
| '02' | xxxx xxxx | xxxx xxxx | xxxx xxxx | xxxx xxxx |
| 5241 | 5242 | | 5243 | |

FIG. 8

Content example for
AESKW wrapped payload:

| |
|---|
| Integrity Check Constant 602 |
| Bit Length of Padding 604 |
| Length of Hash Options 606 |
| Hash Options 608 |
| Hash of AD 610 |
| Clear Key Material 612 |
| Key padding 614 |

600

KEY USAGE POLICIES FOR CRYPTOGRAPHIC KEYS

BACKGROUND

The present invention relates to data processing, and more specifically, to cryptography methods and structures.

Layouts for secure data structures, called key tokens, are used to contain key material and may also include descriptors of the token contents. The token structure changes based on a wrapping method used to protect the key material and other factors, such as what is included in associated data and key control information.

SUMMARY

According to an aspect of the present invention, a computer program product for secure key management is provided. The computer program product includes a tangible storage medium readable by a processing circuit and storing instructions for execution by the processing circuit creating a token and populating the token with key material, and binding key control information to the key material. The key control information includes information relating to usage of the key material populating one or more key usage fields that define attributes that limit actions that may be performed with the key material.

According to another aspect of the present invention, a method is provided. The method includes creating a token and populating the token with key material, and binding key control information to the key material. The key control information includes information relating to usage of the key material populating one or more key usage fields that limit actions that define attributes that that may be performed with the key material.

According to yet another aspect of the present invention, a system for secure key management is provided. The system includes a computer processor and an application configured to execute on the computer processor. The application implements creation of a token and a population of the token with key material, and a binding of key control information to the key material. The key control information includes information relating to usage of the key material populating one or more key usage fields that define attributes that limit actions that may be performed with the key material.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 is an exemplary key management field; and

FIG. 8 depicts a payload section of the token of FIG. 2.

DETAILED DESCRIPTION

Aspects of the present invention concern secure recording with a cryptographic key and management and usage policies for using a cryptographic key for cryptographic operations. Utilizing these new policies, customers will also be assisted in demonstrating compliance with new regulations and standards.

Figure 1:
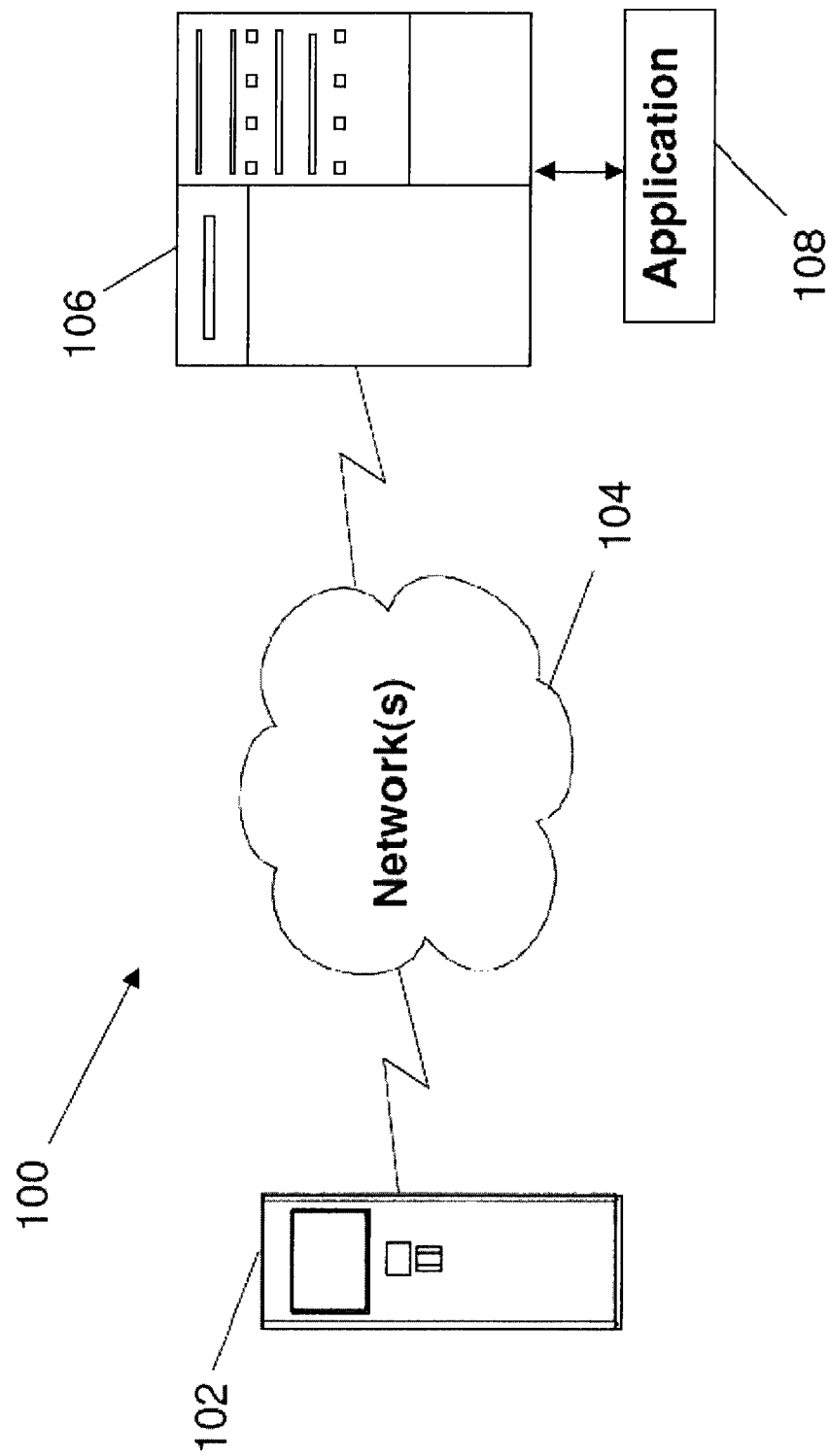
FIG. 1 depicts a block diagram of a system upon which secure key management methods may be implemented in an exemplary embodiment.
Figure 2:
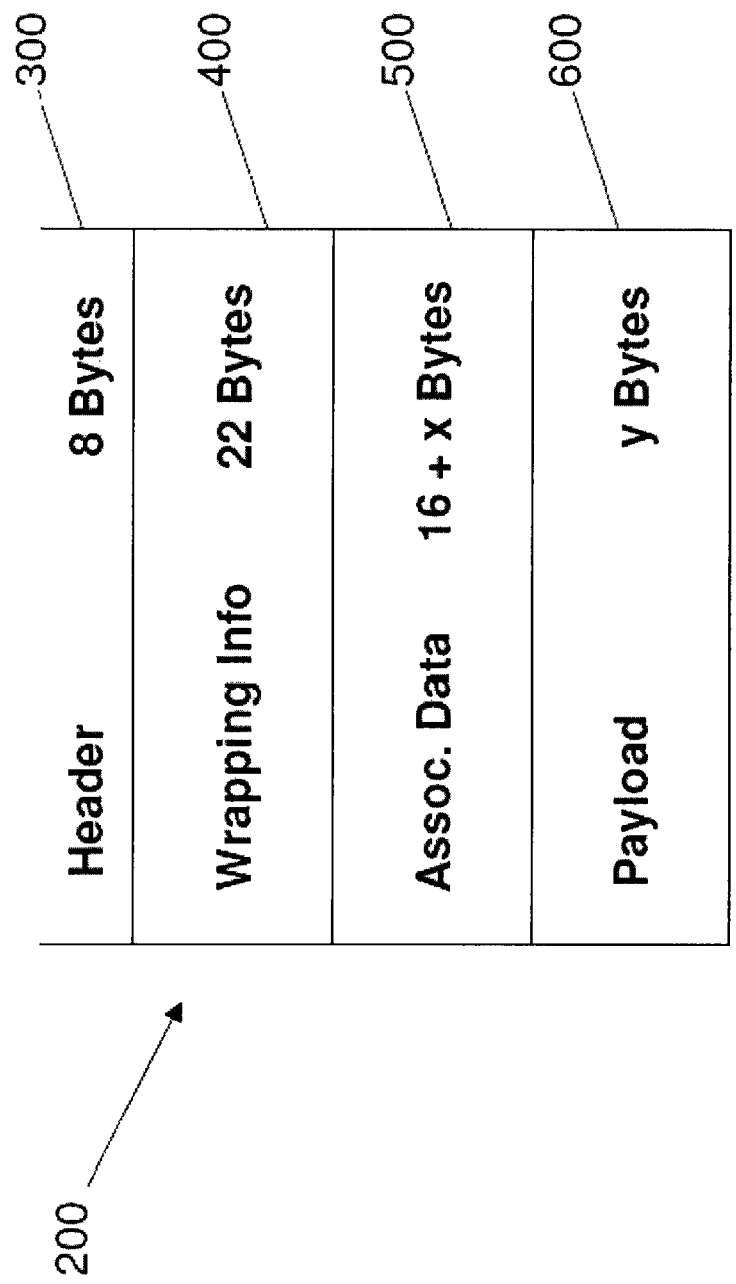
FIG. 2 depicts a block diagram of a token or data structure to manage key material.

With reference now to FIGS. 1 and 2, an exemplary system 100 and key token 200 for providing secure key management will now be described. The key token 200 is a data structure that can hold a complete or partial cryptographic key (i.e., key material) along with key management and usage data associated with and bound to the cryptographic key.

The exemplary system 100 creates, uses and/or transmits key tokens 200 including key material. The system of FIG. 1 includes a user system 102 disposed in communication over one or more networks 104 with a host system 106. The user system 102 represents a first party that submits key material to be communicated to a second party (e.g., the host system 106). The user system 102 may be a point of sale (POS) terminal that is implemented using a computer executing a computer program for carrying out the processes described herein. The user system 102 may include a hardware security module (HSM) that manages cryptographic keys and protects sensitive data and applications. An application 108 is used by the HSM on the host system 106 to create, populate and manage the key token 200. The user system 102 may be a payment terminal, such as an automated teller machine (ATM) or kiosk. The host system 106 may be a financial institution connected to the user system 102 via one or more of the network(s) 104.

The host system 106 receives encrypted data from user system 102 over the one or more networks 104. This encrypted data may include, for example, an account number and PIN information. The application 108 then retrieves the key token 200 and passes the key token 200 to the HSM along with the encrypted data. Inside the HSM, the key token 200 is unwrapped, the key material from the key token 200 is used to decrypt the encrypted data, the encrypted data is verified and a response is returned to the application 108 as an indication of the validity of the encrypted data.

In one exemplary embodiment, the user system 102 includes hardware and software to execute computer instructions to create the key token 200 that securely wraps the key material for local use or for transmission to another party, such as the host system 106. In another exemplary embodiment, the host system 106 executes computer instructions to create the key token 200 that securely wraps the key material for local use or for transmission to another party, such as the user system 102.

The one or more networks 104 may be any type of known networks including, but not limited to, a wide area network (WAN), a local area network (LAN), a global network (e.g. Internet), a virtual private network (VPN) and an intranet. The networks 104 may be implemented using a wireless network or any kind of physical network implementation known in the art. The user system 102 may be coupled to the host system 106 through multiple networks (e.g., intranet and Internet). One or more user systems 102 and the host system 106 may be connected to the networks 104 in a wired or wireless fashion. In one embodiment, the networks 104 include an intranet and one or more user systems 102 executing a user interface application (e.g., a web browser) to contact the host system 106. In another exemplary embodiment, one or more of the user systems 102 is connected directly (i.e., not through the network 104) to the host system 106.

The host system 106 depicted in FIG. 1 may be implemented using one or more servers operating in response to a computer program stored in a storage medium accessible by the server. The host system 106 may include one or more hardware security modules (HSM).

The exemplary secure key management methods and structures may be created and performed by components of the system 100 of FIG. 1.

The user system 102 may include a key token 200 by which the user system 102 encrypts, for example, account data. The user system 102 then sends the encrypted data to application 108, which retrieves a copy of the key token 200 and passes the key token 200 along with the encrypted data into the HSM where verification occurs. The key token 200 is a data structure that includes several sections dedicated to selected tasks, such as describing the key token 200 and key material. A header section 300 includes data used to interpret fields within sections of the key token 200. The exemplary header section 300 may have a fixed-size. A wrapping information section 400 may also be a fixed-size section that contains information pertinent to how (and if) the key material in a payload section 600 is wrapped. The wrapping information section also includes information about how the key material in the payload section 600 is securely bound to the information in an associated data (AD) section 500. The associated data section 500 may also be described as a key control information section but is not necessarily limited to key control information and may include any other information a key creator wants to be associated with the key token 200. The associated data section 500 is a variable-size section that has a small fixed-size portion with some descriptive fields for the key material itself along with fields for the variable-size portions of this section.

The key material resides in the payload section 600 in a selected state. In an example, there are three states, including (1) not present, (2) clear and (3) encrypted/bound. In the not present state, the key token 200 is a "skeleton" containing descriptive and policy information in a useful template that can be populated into a specific token with key material at a later time. The clear state may be used for testing purposes or low security applications, where it is useful to support tokens that have unencrypted key material. In the encrypted/bound state, the key material is accompanied with pre-pended and/or post-pended data (key binding material). The key material and pre-pended or post-pended data conforms to and is wrapped using a supported wrapping method indicated by token fields with the wrapping information section 400. The exemplary key token 200 enables wrapping of the token sections via a suitable wrapping method without altering the key token 200 structure. Specifically, the structure of the header section 300, wrapping information section 400 and associated data section 500 will not change based on the chosen wrapping method.

The various sections of the exemplary key token 200 may have fixed or variable sizes. For example, the header section 300 has the fixed size of 8 bytes and the wrapping information section 400 has the fixed size of 22 bytes. The associated data section 500 has an overall variable size composed of the fixed-size portion of 16 bytes plus a sum of variable-sized other components of the section. Similarly, the payload section 600 has a variable-size depending on the state of the key material. Exemplary payload sizes include: 0 bytes for tokens with no key material; the size of the key length itself for unencrypted key material; and the key length plus key binding material for tokens that include encrypted key material.

Figure 3:
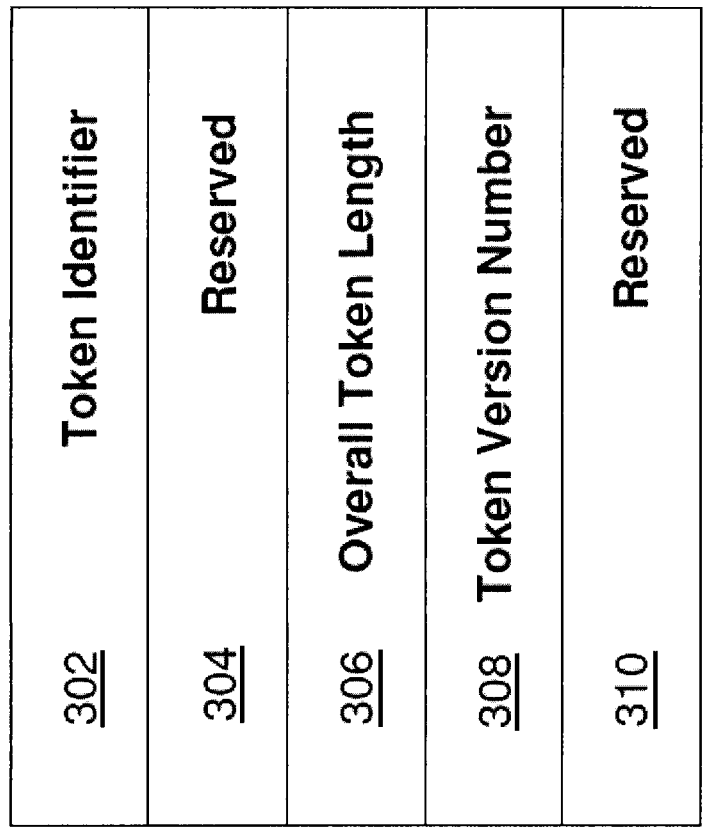
FIG. 3 depicts a block diagram of a header section of the token of FIG. 2.

Turning now to FIG. 3, the exemplary header section 300 of the key token 200 will now be described. The header section 300 includes several fields used to describe aspects of the key token 200. A token identifier field 302 indicates broad token type information to aid processing of the key token 200. Token types that may be listed in the token identifier field 302 include internal tokens for local use, external tokens for sending to another party, or zero token types (i.e., placeholders), depending on usage needs and application requirements. A reserved field 304 is set aside for future use. An overall token length field 306 indicates the entire length of the key token 200, including the header section 300. A token version number field 308 describes a version of the key token 200, which separates this from legacy token structure types supported by systems from the same manufacturer as the current system 100. This enables the system 100 to access and use current and legacy token types on the same machines. A reserved field 310 is also set aside for future use.

Figure 4:
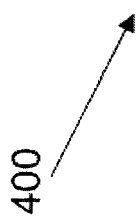
FIG. 4 depicts a block diagram of a wrapping information section of the token of FIG. 2.

FIG. 4 shows exemplary wrapping information section 400, which includes fields to describe how the key material in the payload section 600 is wrapped and secured to the associated data section 500 (key control information). A key material state field 402 describes a state of the key material in the payload section 600. Possible states include: a state in which no key is present; a state in which the key is clear; a state in which the key and a representation of the key control information (such as a hash) is encrypted under a Key Encrypting Key (KEK); and a state in which the key and a representation of the key control information (such as a hash) is encrypted under the secret Master Key (MK) that stays in the HSM.

In the no key present state, the key token is a "skeleton" which contains descriptive and policy information in a useful template that can be populated into a specific token with actual key material at a later time. The clear state is used for testing purposes or low security applications. In the encrypted state of KEK and MK, the key material is wrapped and bound to the key by key binding material. The states available in the key material state field 402 are limited by the token identifier field 302, wherein an external token identifier may have a key material state of no key, a clear key or a KEK encryption. Similarly, an internal token identifier may have a key material state of no key, a clear key or an MK encryption. Accordingly, the KEK key material state is used to send the key material to another party, whereas the MK key material state is used locally by a host application.

With continued reference to FIG. 4, the wrapping key verification pattern (KVP) type field 404 specifies the calculation method, such as a hash algorithm, to apply to the MK or KEK (as described in key material state field 402) used to wrap the payload section 600. The output of the calculation is then compared to the content of a wrapping KVP value field 406 to verify that the correct key has been identified as wrapping the payload section 600. If the values do not match, then the wrong key has been provided and the user is notified of the error. The KVP type field 404 and wrapping KVP value field 406 are not used if the key material state is no key or clear key.

A wrapping method field 408 is used to describe the payload section 600 wrapping method and how it is bound to the associated data section 500. The wrapping method can include the layout of the payload section 600, the logical operations to perform on the key used for encryption, such as KEK or MK, and what steps to do with the key used for encryption to make up the final payload section 600, such as additional encryption steps or operations to bind associated data into the secure payload. The logical operations to perform on the key used for encryption are various steps performed in wrapping the payload section 600. As many as 255 wrapping methods can be described. In one embodiment, four values are assigned to corresponding wrapping methods. Examples of wrapping methods include advanced encryption standard key wrap (AESKW) or a public key encryption scheme that combines algorithms, such as RSA (Rivest Shamir Adelman) with OAEP (Optimal Asymmetric Encryption Padding).

A hash method field 410 describes a hash algorithm applied to the associated data section 500, wherein the resulting hash value is then compared to a stored hash value (field 610) in the payload section 600. This check against the stored value is a mechanism to indicate if the associated data section 500 has been altered. A reserved field 412 is set aside for future use.

Figure 5:
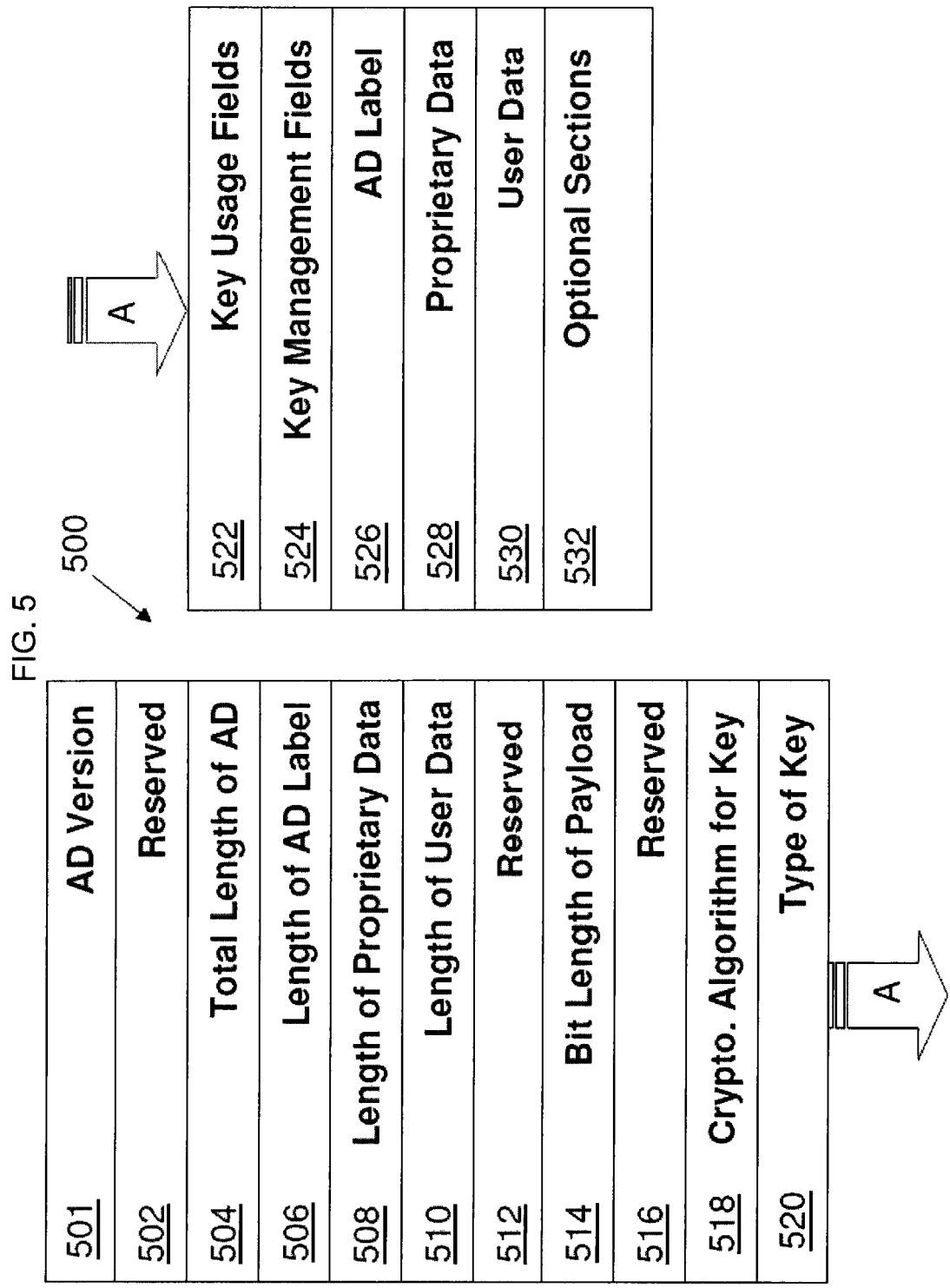
FIG. 5 depicts a block diagram of an associated data section of the token of FIG. 2.

Referring now to FIG. 5, the exemplary associated data (AD) section 500 (also referred to as "key control information section") includes fields for the descriptive fields for the key material and other fields to describe field sizes in this section. An AD version field 501 is used to identify the version of the current AD section 500, thus allowing for future expansion as well as support across multiple versions and layouts. A reserved field 502 is set aside for future use. In addition, reserved fields, in this and other sections, may be utilized to enable alignment of data in the section. A total length of AD field 504 describes the size of the AD section 500. A length of AD label field 506 describes the size of an optional AD label field 526 that is passed by the user. This field gives the label length in bytes. A length of proprietary data field describes a length in bytes of an extensible proprietary data field 528 contained in the AD. A length of user data field 510 describes the size of an extensible user data field 530, wherein the user can populate the variable length field. A reserved field 512 is set aside for future use.

A bit length of payload field 514 describes the length of the payload section 500 in bits, which is important for certain wrapping methods. A reserved field 516 is set aside for future use. A cryptographic algorithm for key field 518 indicates which supported cryptographic algorithm can be used with the key material in the payload. Examples of the algorithm include those used with the following standards: AES, data encryption standard (DES), RSA, Elliptic Curve and message authentication code (MAC). A type of key field 520 defines the categories for use of the key material with the algorithm from field 518. Categories of use are broad and include cipher key, importer KEK, exporter KEK, MAC generate and MAC verify. Key usage fields (KUFs) 522 are a variable length and extensible field or set of fields that define narrower attributes for the key type defined in 520. The key usage fields 522 define attributes that describe how the key material can be used or limit actions that may be performed in various situations available for this type. For example, if the key material is an AES key, it can be used as a wrapping key for exporting other AES keys from this HSM or as an unwrapping key to import other AES keys into this HSM. In another example, if the key material is a cipher key, the key usage fields 522 can further limit key material use to enciphering or deciphering. A plurality of usage description fields may be placed in the set of key usage fields 522. Accordingly, the key usage fields 522 vary in size and interpretation based on other fields, including fields 518 and 520. The exemplary key usage fields 522 may be in the following format: one byte: count of fields that follow this byte; two bytes each: fields with key usage fields data.

Figure 6:
FIG. 6 is an exemplary key usage field.

With reference to FIG. 6, two exemplary key usage fields 522 are provided as a set of five bytes, which include a key usage field count 5221, a key usage field 1 (KUF1) 5222 and a key usage field 2 (KUF2) 5223. The key usage field count 5221 indicates how many key usage fields there are (i.e., 1 to n or two, in the case of FIG. 6) in the key token 200. Each of the KUF1 5222 and KUF2 5223 fields includes two bytes (a high order byte and a low order byte) each containing flag bits (i.e., an independent set of indicators, with each indicator being used to indicate a key exchange of one specific method) describing the capabilities and limitations of the key material of the key token 200 and to provide for pairs of complementary keys. For example, for data encryption purposes according to embodiments of the invention, two key tokens 200 with the same key value can be generated with one key token 200 being capable of encrypting data (retained by the user) and one key token 200 being only capable of decrypting data (provided from the user to his business partner). In accordance with embodiments, each flag bit is independent of other flag bits and each unused bit is reserved and zeroed or set to a 'Not allowed' value.

Referring back to FIG. 5, key management fields (KMFs) 524 are a variable length and extensible field or set of fields that define attributes for the key material wrapped in the token, including what type of KEKs can be used to wrap this key material (if any), and whether the wrapped key material is complete or expects more user contributed material. Other examples of attributes include limiting what can be done to the key material, such as limiting distribution or export of the key material, such as a cipher key, after receipt of the key material by a party. The number of attributes or entries in the key management fields 524 is variable. The key usage fields 522 vary in size and interpretation based on other fields, including fields 518 and 520. The exemplary key management fields 524 may be in the following format: one byte: count of fields that follow this byte; two bytes each: fields with key management fields data.

Exemplary key management fields 524 include fields that allow user policies to be implemented to manage the entire key material life cycle and are extensible to register key history and policies for the remaining life cycle. For example, the additional fields allow updating of life cycle information after receiving the key material. Further, policies may be created after receipt.

With reference to FIG. 7, two exemplary key management fields 524 are provided as a set of five bytes, which include a key management field count 5241, a key management field 1 (KMF1) 5242 and a key management field 2 (KMF2) 5243. The key management field count 5241 indicates how many key management fields there are (i.e., 1 to n or two, in the case of FIG. 6) in the key token 200. Each of the KMF1 5242 and KMF2 5243 fields includes two bytes (a high order byte and a low order byte) each containing flag bits (i.e., an independent set of indicators, with each indicator being used to indicate an action that may be performed on or with the key material) describing the capabilities and limitations of the key material of the key token 200 and to provide for pairs of complementary keys. For example, for data encryption purposes according to embodiments of the invention, two key tokens 200 with the same key value can be generated with one key token 200 being capable of managing data according to a first management policy and one key token 200 being only capable of managing data according to a second policy. In accordance with embodiments, each flag bit is independent of other flag bits and each unused bit is reserved and zeroed or set to a 'Not allowed' value.

In an exemplary embodiment, the high order byte of the KMF1 5242 may be structured as a "1xxx xxxx" indicating that export using a symmetric key is allowed or a "0xxx xxxx" indicating that export using a symmetric key is prohibited, a "x1xx xxxx" indicating that export using an unauthenticated asymmetric key is allowed or a "x0xx xxxx" indicating that export using an unauthenticated asymmetric key is prohibited, a "xx1x xxxx" indicating that export using an authenticated asymmetric key is allowed or a "xx0x xxxx" indicating that export using an authenticated asymmetric key is prohibited, a "xxx1 xxxx" indicating that export to a TR-31 format is allowed or a "xxx0 xxxx" indicating that export to a TR-31 format is prohibited or a "xxxx 1xxx" indicating that export in RAW format is allowed or a "xxxx 0xxx" indicating that export in RAW format is prohibited. Meanwhile, the low order byte of the KMF1 5242 may be structured as a "0xxx xxxx" indicating that export using a DES key is allowed or a "1xxx xxxx" indicating that export using a DES key is prohibited, a "x0xx xxxx" indicating that export using an AES key is allowed or a "x1xx xxxx" indicating that export using an AES key is prohibited or a "xxxx 0xxx" indicating that export using an RSA key is allowed or a "xxxx 1xxx" indicating that export using an RSA key is prohibited. Of course, it is to be understood that these cases are merely exemplary and that many other possibilities and combinations exist.

As discussed above, the AD label field 526 is a user specified field that gives a meaningful name to the token 200. The label is within the token 200, thereby enabling recovery of the label via field 526. Further, the AD label field is securely bound to the key material due to being wrapped as part of the AD section 500 with the key material. Since the label is unencrypted, the label can be used by the host system, for example, to check if the user is authorized to use the key token 200. The proprietary data field 528 is for the HSM provider to include their own data or identifiers, which will be securely bound to the key material if an appropriate wrapping method is selected. The user data field 530 is for user populated data and may hold data as designated by the HSM-using host application. Accordingly, the user populates the data using an interface on a host application. The optional sections fields 532 allow for further extensibility of the token 200 at the discretion of the HSM-using host application 108 or the HSM manufacturer. Each optional section field is in the format of unique identifier, length (must include length of identifier and length fields) and an optional data section.

Referring now to FIG. 8, the exemplary payload section 600 may have no content, or not be wrapped (key material is here by itself and is not encrypted), which is indicated by an integrity check constant field 602. If the payload section 600 contains wrapped content then fields 408 and 410 can be used to interpret the payload contents and the method for using the appropriate KEK or MK to unwrap the payload. As stated above, the payload section 600 layout depends on the wrapping method chosen, such as AESKW or RSAES-OAEP wrapping methods. Moreover, the structure and layout of the header section 300, wrapping information section 400, associated data section 500 and payload section 600 are independent and remain the same as the wrapping method for the token 200 and payload section 600 are changed. As an example, the AESKW wrapping method and corresponding payload layout will be described.

The integrity check constant value field 602 includes a known constant that is used to determine if the unwrap succeeded before looking at other fields in the section. If the constant is not correct then the payload was corrupted or modified in some way outside the control of the HSM. The corruption or modification is then alerted to the user. A bit length of padding field 604 is used to describe if there is padding and the size of padding, depending on the bit length of the key material in the payload. Thus, this field indicates how much padding to remove. A length of hash options field 606 describes the length of a hash options field 608. The hash options field 608 describes various options that may be used in computing the hash of AD field 610, while still conforming to the AESKW standard. The hash of AD 610 is the hash value of the AD section 500, used to verify that the section has not been altered. A clear key material field 612 contains the key material or secret key that is carried in the payload section 600. A key padding field 614 is used to pad the key material and depends on the size of the key material in field 612.

Technical effects and benefits of the present invention include providing a method for secure key management, the method including creating a token and populating the token with key material and binding key control information to the key material. The key control information includes information relating to usage of the key material populating one or more key usage fields that that define attributes that limit actions that may be performed with the key material.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for secure key management, the computer program product comprising:
 a non-transient computer readable medium readable by a processing circuit and storing instructions for execution by the processing circuit for:
 creating a token and populating the token with key material; and
 cryptographically binding key control information to the key material such that the key material is accompanied with key binding material, which conforms to and is wrapped using a wrapping method indicated by token fields that are unchanged by a chosen wrapping method, the key control information including:
 information relating to usage of the key material populating one or more key usage fields that define attributes that limit actions that may be performed with the key material,
 wherein the key control information further comprises a key usage field count indicating a number of the key usage fields and each of the key usage fields comprises:
 a high order byte containing flag bits as an indicator, the high order flag bits comprising a first position defining a rule for export using a symmetric key, a second position defining a rule for export using an unauthenticated asymmetric key, a third position defining a rule for export using an authenticated asymmetric key, a fourth position defining a rule for export to a TR-31 format and a fifth position defining a rule for export in RAW format; and
 a low order byte containing flag bits as an indicator, the low order flag bits comprising a first position defining a rule for export using a DES key, a second position defining a rule for export using an AES key and a fifth position defining a rule of export using an RSA key, each of the indicators being independent and indicative of one key exchange that is performable with the key material.

2. The method according to claim 1, wherein the number of the key usage fields is 1 to n.

3. The method according to claim 1, wherein a fixed set of indicators have indicators that are in use and indicators that are reserved, the reserved indicators being set to 'Not allowed'.

4. A system for secure key management, comprising:

a computer processor; and an application configured to execute on the computer processor, the application implementing:

creation of a token and population of the token with key material; and a cryptographic binding of key control information to the key material such that the key material is accompanied with key binding material, which conforms to and is wrapped using a wrapping method indicated by token fields that are unchanged by a chosen wrapping method, the key control information including:

information relating to usage of the key material populating one or more key usage fields that that define attributes that limit actions that may be performed with the key material, wherein each of the key usage fields comprises:

a high order byte containing flag bits as an indicator, the high order flag bits comprising a first position defining a rule for export using a symmetric key, a second position defining a rule for export using an unauthenticated asymmetric key, a third position defining a rule for export using an authenticated asymmetric key, a fourth position defining a rule for export to a TR-31 format and a fifth position defining a rule for export in RAW format; and a low order byte containing flag bits as an indicator, the low order flag bits comprising a first position defining a rule for export using a DES key, a second position defining a rule for export using an AES key and a fifth position defining a rule of export using an RSA key, each of the indicators being independent and indicative of one key exchange that is performable with the key material.

5. The method according to claim 4, wherein the number of the key usage fields is 1 to n.

6. The method according to claim 4, wherein the key control information further comprises a key usage field count indicating a number of the key usage fields.

7. The method according to claim 4, wherein a fixed set of indicators have indicators that are in use and indicators that are reserved, the reserved indicators being set to 'Not allowed'.

* * * * *